United States Patent Office 3,660,276
Patented May 2, 1972

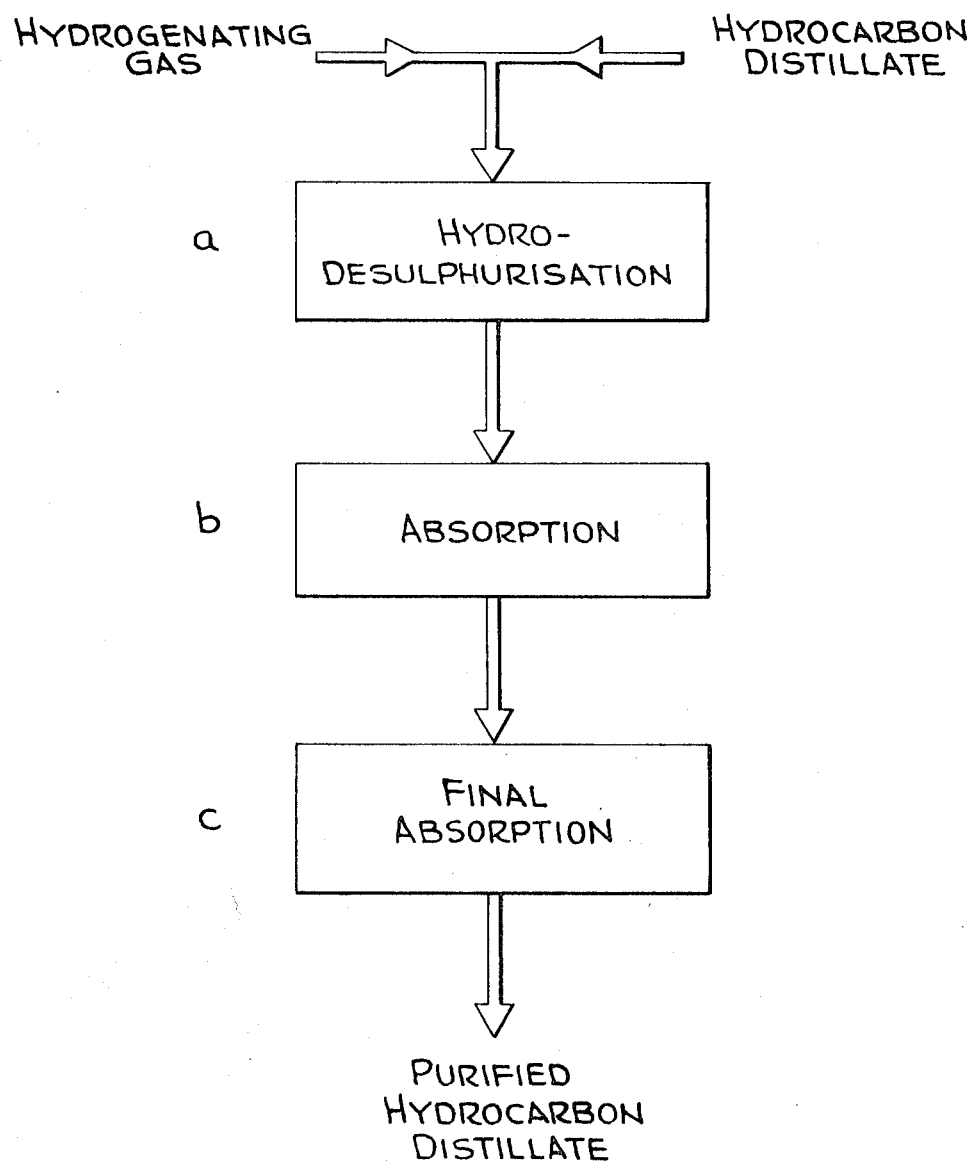

3,660,276
PURIFICATION OF HYDROCARBON OILS
John Aldwyn Lacey, Solihull, England, assignor to The Gas Council, London, England
Filed Mar. 20, 1969, Ser. No. 809,016
Claims priority, application Great Britain, Mar. 21, 1968, 13,738/68; Aug. 22, 1968, 40,252/68
Int. Cl. C10g 23/00, 31/14
U.S. Cl. 208—212
9 Claims

ABSTRACT OF THE DISCLOSURE

In a process for desulphurising hydrocarbon distillate oils, a mixture of the oil vapour and a carbon oxide-containing hydrogenating gas is passed over (a) a hydrodesulphurisation catalyst and then (b) a material capable of absorbing hydrogen sulphide and rapidly eliminating any carbonyl sulphide present either by absorbing the carbonyl sulphide or by converting it to hydrogen sulphide and absorbing the hydrogen sulphide.

The hydrogenating gas may be a lean gas, a town gas, a rich gas, or a substitute natural gas produced by steam reforming the desulphurised distillate oil.

The material used in stage (b) is preferably zinc oxide.

The process is capable of attaining a very high degree of purification (e.g. 0.2 p.p.m. or less). When a high degree of purification cannot be attained by use of a single pair of stages (a) and (b), the desired degree of purification can be attained by passing the mixture over (c) a zinc oxide-copper oxide composition or by repeating the stages (a) and (b).

---

This invention relates to the purification of hydrocarbon oils and is particularly suitable for the purification of light distillates and kerosine.

In British specification No. 1,028,245 there is described and claimed a process for the purification of light distillate down to a level of not more than 0.3 p.p.m. of sulphur, by the removal of sulphur therefrom, which process comprises passing a mixture of the light distillate in vapor form and a hydrogenating gas containing oxides of carbon, the mixture containing at least 3 parts by volume of hydrocarbons per part of hydrogen but containing a substantial excess of hydrogen over that required for reaction with unsaturated hydrocarbons, carbon monoxide and carbon dioxide in the mixture, over a hydrodesulphurisation catalyst comprising molybdenum supported on alumina with nickel as a catalyst promoter to convert the sulphur present in the distillate into hydrogen sulphide, the hydrogen sulphide formed being subsequently remove from the treated distillate. In United States Pat. No. 3,331,770, commonly owned herewith a process is disclosed for the purification of a hydrocarbon distillate oil, in particular light distillate and kerosine, which contains sulphur by the removal of sulphur therefrom which process comprises a conversion stage in which the distillate vapours, mixed with a hydrogenating gas containing oxides of carbon, are reacted in the presence of a hydro-desulphurisation catalyst to convert the sulphur present in the distillate to hydrogen sulphide, and at least two separated absorption stages, in each of which the mixture of gases and vapours resulting from the conversion stage is passed over a mass of material for absorbing hydrogen sulphide, whereby the sulphur content of the mixture is reduced to the desired degree.

The processes generally described in these two prior patents desirably require the use of a hydrogenating gas which contains more hydrogen than is stoichiometrically required in the event of reaction with carbon oxides. Further, while the procedure described in United States Pat. No. 3,331,770 is useful it represents in practice a somewhat complicated method of dealing with the difficulties which arise owing to the presence of carbon oxides in a hydrogenating gas which is conveniently available on sites where steam reforming of hydrocarbons takes place; it is the presence of carbon oxides which gives rise to difficulties when the absorbent is that particularly described in prior patents, namely a form of iron oxide.

The use of excess hydrogen over the carbon oxides is becoming in practical operation an increasingly unwelcome requirement. In the normal naphtha purification processes, the purified vapour of the naphtha or other hydrocarbon distillate oils is immediately mixed with steam and catalytically gasified, such as to a lean gas, a town gas or a rich gas, and the product of that process then undergoes various subsequent treatments; in particular, carbon monoxide conversion and carbon dioxide removal. In this present period with the increasing introduction of natural gas it is becoming increasingly likely that the product gas will in the future undergo methanation to produce a natural gas substitute and in this case the removal of carbon dioxide will in all probability be delayed until after a final methanation stage. In such cases the gases available at the outlets of the various process stages and which could be used as the hydrogenating gas for the purification of the hydrocarbon distillate oils will either contain relatively large amounts of carbon oxides, e.g. 20% of carbon dioxide, and in particular less hydrogen than that stoichiometrically required in the event of methanation of the carbon oxides in the purification unit, or contain virtually no hydrogen after the final process of methanation and carbon dioxide removal.

A convenient source of hydrogen for the purification process is a side stream of one of these gases, the gases being taken to the purification plant inlet. It is, therefore, necessary either to install special equipment in such a side stream which comprises at least a carbon dioxide scrubber and possibly a carbon monoxide converter; such additional provisions require increased capital costs for plant. Alternatively it is necessary to devise means for using gases which are rich in carbon oxides so that prior treatment of the gas used for purification is unnecessary. The present invention is concerned with a process for desulphurising hydrocarbon distillate oils using gases containing carbon oxides.

According to the present invention there is provided a process for desulphurising hydrocarbon distillate oils, in particular light distillate and kerosine, which process comprises passing the vapour of the oil together with a hydrogenating gas comprising one or more oxides of carbon over (a) a hydrodesulphurisation catalyst and then (b) a material capable of quantitatively absorbing the hydrogen sulphide produced and either quantitatively absorbing the carbonyl sulphide which may also be produced by reaction involving the carbon oxides or quantitatively converting carbonyl sulphide to hydrogen sulphide and absorbing the latter, the process being carried out such that substantially no carbonyl sulphide persists in the gas phase downstream of the region in which absorption of the hydrogen sulphide is complete. It will be understood that in the operation of the process of the invention sulphur compounds other than carbonyl sulphide are decomposed, and the hydrogen sulphide absorbed, as and to the extent described in the above-mentioned patents.

The drawing figure diagrammatically shows the process in accordance with the present invention for desulfurizing hydrocarbon distillate oils.

The hydrogenating gas will conveniently be prepared by steam reforming a hydrocarbon distillate oil and such hydrogenating gas will normally contain substantially no paraffinic hydrocarbons of higher molecular weight than butane and no unsaturated hydrocarbon.

The hydrogenating gas may contain less hydrogen by volume than the total of four times the volume of the carbon dioxide and three times the volume of the carbon monoxide. In practice it will be convenient to use hydrogenating gas obtained by the gasification of a prior treated portion of the hydrocarbon distillate oil which is being desulphurised.

The three types of hydrogenating gas which may conveniently be made available, broadly described as lean gas, town gas and rich gas, commonly arise from operating steam-reforming processes under different conditions, as are respectively indicated below. Thus the hydrogenating gas may be produced by the steam reforming of hydrocarbons at temperatures above 700° C. such that the volumetric proportions of the principal constituents of the gas are within the ranges:

$CO_2$ 10–25: CO 1–15: $CH_4$ 1–15: $H_2$ 55–85 percent by volume. Another type of hydrogenating gas which may be used is that produced by the steam reforming of hydrocarbons at temperatures within the range 600–700° C. such that the volumetric proportions of the principal constituents of the gas are within the ranges:

$CO_2$ 15–22: CO 2–10: $CH_4$ 30–50: $H_2$ 25–55 percent by volume. Furthermore the hydrogenating gas may be one produced in a steam reforming process which is thermally self-supporting and conducted at temperatures between 450° and 600° C. such that the volumetric proportions of the principal constituents of the gas are within the ranges:

$CO_2$ 18–22: CO 0.1–2: $CH_4$ 55–70: $H_2$ 5–22 percent by volume.

A gas containing even less hydrogen than 5 percent, for instance, 3 percent, may be used, particularly with low-boiling distillates; such a gas is formed when the above-mentioned hydrogenating gases are submitted to methanation processes for the production of substitute natural gas.

The hydrodesulphurisation catalyst may conveniently contain molybdenum or nickel or cobalt, said single metal catalyst being used in the desulphurising reaction in the sulphided form. However, a preferred catalyst is the known hydrodesulphurisation catalyst containing molybdenum which is promoted by the presence of nickel and supported on alumina; such a material is sold under the tradename "Nimox." Another known hydrodesulphurisation catalyst which is suitable for use in the process of the invention is that sold under the tradename "Comox" which comprises molybdenum promoted with cobalt, supported on alumina.

One material capable of quantitatively absorbing hydrogen sulphide and also eliminating such carbonyl sulphide as may be present is zinc oxide; as will be explained later the absorbent may not be iron oxide which is frequently used to absorb hydrogen sulphide and which material is the only absorbent described in the two above mentioned patents.

An alternative material to zinc oxide is a zinc oxide-copper oxide composition, as described hereinafter. This composition is considerably more expensive than zinc oxide itself, and therefore its use in stage (b) is not preferred.

The process of this invention is useful for desulphurising any hydrocarbon distillate oil which can be conveniently vaporised. The hydrocarbon distillate oil may be a straight-run naphtha having a final boiling point not exceeding 185° C. or a straight-run naphtha having a final boiling point not exceeding 230° C. Also the hydrocarbon distillate oil may be a kerosine having a final boiling point not exceeding 285° C.

The proportion of hydrogenating gas to oil vapour which is introduced into the hydrodesulphurisation stage may be such that at least 0.5 s.c.f. of hydrogen is supplied per lb. of vapour; generally it is preferred to use from 0.5 to 3.0 s.c.f. of hydrogen per lb. of oil vapour.

The temperatures at which the two essential stages of this process may be carried out may be different for each stage, although as a matter of practical convenience the two stages will generally be operated at substantially the same temperature; zinc oxide will absorb hydrogen sulphide and eliminate carbonyl sulphide at a lower temperature than is preferred for the hydrodesulphurisation stage. The temperature of the hydrodesulphuration catalyst may be a temperature within the range 250–450° C. although in general it is desirable to operate this stage at temperatures below 400° C., for example 300–400° C. A preferred temperature for the hydrodesulphurisation catalyst, when such catalyst is a "Nimox" or "Comox" catalyst, is from 360–380° C. The temperature at which the absorber operates may be a suitable temperature between 200° and 450° C.

The process of the invention may be operated at any convenient pressure. The pressure may, for example, be above 5 atmospheres and will desirably be below that at which condensation of the hydrocarbon vapour can take place; preferred pressures are those between 10 and 50 atmospheres.

The total degree of the desulphurisation which will generally be effected by operating the process of the invention depends on the extent to which mercaptan-type and thiophene-type sulphur compounds are decomposed. The sulphur content of the treated hydrocarbons will be the higher the higher is the final boiling point and the original sulphur content of the hydrocarbon distillate oil and the lower the content of hydrogen in the hydrogenating gas. Thus, for example, distillates of final boiling point up to 125° C., typically having sulphur contents up to 300 p.p.m. by weight, when treated with a suitable proportion, for example, 1 cu. ft. of hydrogen in the hydrogenating gas per lb. of distillate, can be purified (see figure) in a single pair of stages (a) and (b) (that is, one hydrodesulphurisation stage followed by one zinc oxide stage) to the extent that the purified distillate contains no more than 0.2 p.p.m. of sulphur, using as hydrogenating gas any gas normally produced by steam reforming of purified naphtha.

Distillates having a higher final boiling point (for example, of 125° C. to 185° C.) and typically having sulphur contents of up to 500 p.p.m. can be purified down to 0.2 p.p.m. of sulphur with hydrogenating gases of the lean gas and town gas type that have not been treated for the removal of carbon oxides; but they cannot be purified to this degree in a single pair of stages (a) and (b) (when zinc oxide is used in stage (b)) with a hydrogenating gas (such as a rich gas) containing less hydrogen than lean or town gas. In this case, the desired purity may be attained by the use of more than one pair of hydrodesulphurisation and absorption stages. For example, a distillate of final boiling point 165° C. when treated with unscrubbed rich gas can be purified down to 0.3 p.p.m. of sulphur in two pairs of stages (a) and (b). Alternatively such distillates can be purified to the highest degree in such conditions, but using only a single pair of stages (a) and (b), by placing a zinc oxide-copper oxide composition downstream of the absorber. This composition acts as a catch for the final traces of sulphur compounds.

Thus, this invention also provides a process (see figure) for desulphurising hydrocarbon distillate oils, which process comprises passing the vapour of the oil together with a hydrogenating gas comprising one or more oxides of carbon over (a) a hydrodesulphurisation catalyst, (b) a material capable of quantitatively absorbing the hydrogen sulphide produced and either quantitatively absorbing the carbonyl sulphide which may also be produced by reaction involving the carbon oxides or quantitatively converting carbonyl sulphide to hydrogen sulphide and absorbing the latter, and (c) a composition comprising zinc oxide and copper oxide, the process being carried out such that substantially no carbonyl sulphide persists in the gas phase downstream of the region in which absorption of the hydrogen sulphide is complete.

The temperatures and pressures used in stage (c) are generally the same as those used in stages (a) and (b).

Although any of the above-mentioned distillates and hydrogenating gases may be used in this embodiment of the invention, it is most useful with the higher boiling distillates and the hydrogenating gases of lower hydrogen content. For example, the distillate may be one having a final boiling point of 125° C. to 185° C., and the hydrogenating gas may be the product gas of a thermally self-supporting steam reforming process conducted at a temperature between 450° C. and 600° C. and containing: $CO_2$ 18–22: CO 0.1–2: $CH_4$ 55–70: $H_2$ 5–22 percent by volume.

The zinc oxide-copper oxide composition preferably contains substantially only the two oxides, and preferably about 1 part by weight of copper oxide and 2 parts by weight of zinc oxide. Typically, the volume of the composition used is about one-third of that of the zinc oxide absorbent commonly used in stage (b).

As stated above, the material used in stage (b) may be a composition comprising zinc oxide and copper oxide, in which case stage (c) may be dispensed with.

Following is a description by way of example of processes according to the invention.

EXAMPLE 1

The purification of light distillate of final boiling point below 125° C., was carried out employing the following materials and conditions:

Conversion catalyst: "Nimox," a commercially-available catalyst comprising molybdenum and nickel supported on alumina, in the form of ⅛ in. extrudates about ³⁄₁₆ in. long.

Absorber: A commercially-available material consisting of zinc oxide, in the form of spherical pellets about ⅛ in. diameter.

Light Distillate:
  Initial boiling-point ° C. _____ 46
  Final boiling-point ° C. _____ 111
  Sulphur content, p.p.m. by weight _ From 140 to 220

Hydrocarbon type analysis, percent by volume:
  Olefins _____ 0.1
  Aromatics _____ 2.1
  Paraffins _____ 97.8

Operating temperatures, ° C.:
  Conversion stage _____ 375
  Adsorption stage _____ 375
  Pressure _____ 28 atmospheres Space velocities, lb. of distillate oil per hour per cubic foot of space occupied by:
  Conversion catalyst _____ 90
  Absorber _____ 23

| | Experiment No. | | |
|---|---|---|---|
| | IA | IB | IC |
| Hydrogen-containing gas: Type | Unscrubbed lean gas | Unscrubbed town gas | Unscrubbed rich gas |
| Composition, percent by volume: | | | |
| $CO_2$ | 21.6 | 21.0 | 20.0 |
| CO | 2.9 | 3.0 | 0.6 |
| $CH_4$ | 12.2 | 27.8 | 62.4 |
| $H_2$ | 63.3 | 48.2 | 17.0 |
| Total | 100.0 | 100.0 | 100.0 |
| Hydrogen supplied in gas, s.c.f. per lb. of distillate oil | 1.0 | 1.0 | 1.0 |
| Sulphur content of distillate at outlet of absorber, p.p.m | 0.02 | 0.06 | 0.11 |
| Duration of experiments, hours | 488 | 1,034 | 690 |

EXAMPLE 2

This example describes the purification of light distillate of final boiling-point below 185° C.

The conversion catalyst and absorber, operating temperatures and pressures, space velocities and gas compositions were the same as those used in Example 1.

| Experiment No | IIA | IIB | IIC |
|---|---|---|---|
| Initial boiling point, ° C | 36 | 36 | 47 |
| Final boiling point, ° C | 166 | 166 | 165 |
| Sulphur content, p.p.m | ¹406 | 280–400 | ¹390 |
| Hydrocarbon type analysis, percent by volume: | | | |
| Olefins | 0.2 | 0.2 | 0.0 |
| Aromatics | 4.9 | 4.9 | 4.9 |
| Paraffins | 94.9 | 94.9 | 95.1 |
| Hydrogenating gas: Type | Unscrubbed lean gas | Unscrubbed town gas | Unscrubbed rich gas |
| Hydrogen supplied in gas, s.c.f. per lb. of distillate oil | 1.0 | 1.0 | 1.0 |
| Sulphur content of distillate at outlet of absorber, p.p.m | 0.05 | 0.10 | 0.3 |
| Duration of experiment, hours | 217 | 1,381 | 1,144 |

¹ Average.

In the above described examples the sulphur levels specified were maintained without breakthrough of hydrogen sulphide. No carbonyl sulphide was detected at the outlet. The zinc oxide upstream of the boundary of the hydrogen sulphide absorption zinc was about 80 percent sulphide which is as satisfactory an approach to complete exhaustion of its absorptive capacity as is practicable.

These examples particularly illustrate the conditions under which a purified distillate containing less than 0.2 p.p.m. of sulphur can be obtained by the process of the invention. It is seen that where it is necessary to use a hydrogenating gas containing comparatively little hydrogen, or where a distillate is used that is difficult to purify, it is likely to be possible to use conditions which will provide a final sulphur content of, for example, 0.5 p.p.m.; if such a material requires to betreated to a lower value it will be appreciated that this can be achieved by employing two pairs of hydrodesulphurisation and absorbtion stages, or by the technique described in the following example.

EXAMPLE 3

The purification of light distillate of final boiling point below 185° C. was carried out employing the following material and conditions:

Conversion catalyst: "Nimox" a commercially available catalyst comprising molybdenum and nickel supported on alumina, in the form of ⅛ in. extrudates about 3/16 in. long.

Absorbent: A commercially available material consisting of zinc oxide in the form of spherical pellets about ⅛ in. diameter.

Catch: A commercially available catalyst comprising copper oxide and zinc oxide (approximately 1 part by weight copper oxide and two parts by weight zinc oxide) in the form of pellets about 3/16 in. diameter by ⅛ in. long.

Light distillate:
| | |
|---|---|
| Initial boiling point ° C. | 36 |
| Final boiling point ° C. | 168 |
| Sulphur content, p.p.m. by weight | 300 |

Hydrocarbon type analysis, percent by volume:
| | |
|---|---|
| Olefins | 0.2 |
| Aromatics | 4.9 |
| Paraffins | 94.9 |

Operating temperatures, ° C.:
| | |
|---|---|
| Conversion stage | 375 |
| Absorption stage | 375 |
| Catch | 375 |
| Pressure | 28 atm. |

Space velocities, lb. of distillate oil per hour per ft.³ of space occupied by:
| | |
|---|---|
| Conversion catalyst | 90 |
| Absorber | 23 |
| Catch | 60 |

Hydrogen containing gas: type, Unscrubbed rich gas
Composition, percent by volume:
| | |
|---|---|
| $CO_2$ | 20.0 |
| CO | 0.6 |
| $CH_4$ | 62.4 |
| $H_2$ | 17.0 |
| | 100.0 |

| | |
|---|---|
| Hydrogen supplied in gas, s.c.f./lb. of distillate oil | 1.0 |
| Sulphur content of distillate at outlet if absorber p.p.m. | [1] 0.3 |
| Sulphur content of distillate at outlet of catch | 0.10 |
| Duration of experiment, hours | 1278 |

[1] This figure, which obtained throughout the major part of the duration of the experiment, rose to 0.9 p.p.m. at the end, as the absorptive capacity of the zinc oxide approached exhaustion.

When using the process of the present invention it has been found that methanation which may take place with a hydrodesulphurisation catalyst, for example, "Nimox" or "Comox" in circumstances where relatively small amounts of hydrogen are present, i.e. the environment is starved of hydrogen, is not to be feared so long as the temperature is not too high, i.e. is generally not above 450° C. and is preferably not above 400° C. The risk of methanation, which is more appreciable within the higher temperature range, is usually slight and can be discounted by virtue of the presence of sulphur compounds in the oil to be purified, as the hydrogen sulphide produced as a result of hydrodesulphurisation maintains the hydrodesulphurisation catalyst in a sulphided condition. Carbonyl sulphide, however, will still be formed in the hydrodesulphurisation stage and a particular advantage of the present invention over that described in United States Pat. No. 3,331,770 is that the absorbent in this process, for example, zinc oxide, is free from the shortcomings displayed by an iron oxide absorbent, since zinc oxide is capable of rapidly decomposing carbonyl sulphide and, of course, absorbing the hydrogen sulphide which is produced. It will, therefore, be appreciated that a carbonyl sulphide absorption zone which was experienced with the process disclosed in U.S. Pat. No. 3,331,770 is not formed to any appreciable degree in the process of this invention and the need for two interchangeable vessels does not arise. In addition methanation is not to be feared with zinc oxide absorbent.

I claim:
1. A process for desulfurizing a hydrocarbon distillate oil which process comprises passing the vapor of the oil together with a hydrogenating gas including carbon dioxide and carbon monoxide over (a) a hydrodesulfurization catalyst and then (b) a zinc oxide material capable of quantitatively absorbing the hydrogen sulfide produced and quantitatively absorbing the carbonyl sulfide which may also be produced by reaction involving said carbon oxides and finally (c) a zinc oxide-copper oxide composition to absorb final traces of sulfur compound, the process being carried out such that substantially no carbonyl sulfide persists in the gas phase downstream of the region in which absorption of the hydrogen sulfide is taking place, said hydrogenating gas being produced by the steam reforming of a hydrocarbon distillate oil which has been desulfurized by said process, the volumetric proportions of the principal constituents of the hydrogenating gas being selected from the group consisting of:
  (i) $CO_2$ 10–25: CO 1–15: $CH_4$ 1–5: $H_2$ 55–85
  (ii) $CO_2$ 15–22: CO 2–10: $CH_4$ 30–50: $H_2$ 25–55 and
  (iii) $CO_2$ 18–22: CO 0.1–2: $CH_4$ 55–70: $H_2$ 5–22 percent by volume.

2. A process as claimed in claim 1 wherein the hydrocarbon distillate oil is selected from the group consisting of a straight-run naphtha having a final boiling point not exceeding 230° C. and a kerosine having a final boiling point not exceeding 285° C.

3. A process as claimed in claim 1 wherein the hydrocarbon distillate oil is a light distillate having a final boiling point below 125° C.

4. A process as claimed in claim 1 wherein the proportion of hydrogenating gas to oil vapour which is introduced into the hydrodesulfurization stage (a) is such that there is from 0.5 to 3 s.c.f. of hydrogen per pound of oil vapour.

5. A process as claimed in claim 1 wherein the hydrodesulphurisation catalyst comprises molybdenum supported on alumina and is promoted by a metal selected from the group consisting of nickel and cobalt.

6. A process as claimed in claim 1 wherein the hydrodesulfrization stage (a) is carried out at a temperature of 300 to 400° C.

7. A process as claimed in claim 1 wherein the hydrogen sulfide and carbonyl absorption is carried out at a temperature of 200 to 450° C.

8. A process as claimed in claim 1 wherein the hydrocarbon distillate oil has a final boiling point of 125° C. to 185° C. and said hydrogenating gas is produced by steam reforming said oil after it has been desulphurised and the volumetric proportions of the principal constituents of which are:

$CO_2$ 18–22: CO 0.1–2: $CH_4$ 55–70: $H_2$ 5–22

9. In a process for desulfurization of a hydrocarbon feedstock contaminated with sulfur compounds wherein a mixture of the feedstock in vaporous form and a hydrogenating gas comprising hydrogen and a carbon oxide are contacted with a hydrodesulfurization catalyst to produce an effluent containing hydrogen sulfide and wherein by virtue of the presence of said carbon oxide in said gas said effluent also contains carbonyl sulfide, a procedure for removing said hydrogen sulfide and said carbonyl sulfide from the effluent comprising:
  contacting said effluent in a first absorption zone with an effective amount of a first material capable of quantitatively removing hydrogen sulfide and carbonyl sulfide from said effluent, said first material comprising zinc oxide;
  contacting said effluent in a second absorption zone with an effective amount of a second absorbent material capable of quantitatively removing hydrogen sulfide and carbonyl sulfide from said effluent, said second material comprising zinc oxide and copper oxide;

maintaining said effluent in said absorption zones for a sufficient period of time to remove substantially all of the hydrogen sulfide and carbonyl sulfide therefrom; and withdrawing substantially sulfur free effluent from said second zone.

References Cited

UNITED STATES PATENTS

| | | | |
|---|---|---|---|
| 2,357,121 | 8/1944 | Lovell | 208—246 |
| 2,761,815 | 9/1956 | Hutchings | 208—296 |
| 3,063,936 | 11/1962 | Pearce et al. | 208—212 |
| 3,331,770 | 7/1967 | Cockerham | 208—212 |

FOREIGN PATENTS

| | | | |
|---|---|---|---|
| 1,044,771 | 10/1966 | England | 208—211 |

DELBERT E. GANTZ, Primary Examiner

G. J. CRASANAKIS, Assistant Examiner

U.S. Cl. X.R.

208—246, 247